INVENTOR.
James W. Giffen
ATTORNEY

INVENTOR.
James W. Giffen
BY
ATTORNEY

United States Patent Office 3,582,454
Patented June 1, 1971

3,582,454
GLASS ARTICLE FORMING AND TRIMMING
James W. Giffen, Corning, N.Y., assignor to
Corning Glass Works, Corning, N.Y.
Filed Nov. 4, 1968, Ser. No. 773,265
Int. Cl. C03b 9/46, 23/02
U.S. Cl. 161—149                                           5 Claims

ABSTRACT OF THE DISCLOSURE

Composite sheet glass having a central stratum and outer stratums is trimmed by forcing an outer stratum over the central stratum to produce a trimmed edge which is virtually encased by the outer stratums.

BACKGROUND OF THE INVENTION

The present invention relates to glass forming and trimming, and is an improvement to the invention disclosed in Giffen Pat. No. 3,193,367, granted July 6, 1965. That patent was directed to the problems encountered in trimming a newly formed article from surrounding glass sheet before the glass became chilled. The sheet was maintained in spaced relationship from a wall of the forming die, which served as one trimmer edge, so as to minimize the chilling effect of the die on the glass sheet.

The present invention, while desirably utilizing all the advantages taught by the aforesaid patent, is further concerned with the solution to problems encountered when the article to be trimmed is formed from a composite or stratified sheet of glass, such as disclosed in copending Giffen et al. application Ser. No. 735,074 filed June 6, 1968. As taught in such application, the laminated sheet comprises a thick inner core or stratum of glass under slight tension encased between two relatively thin outer layers or sheets of glass under compression. When such a composite sheet of glass is trimmed, it is desirable that the thick inner stratum be as nearly completely confined as possible by the two outer stratums thereof. That is, since the outer layers function to apply a protective compressive force over the otherwise exposed trim edge portions of such inner stratum, the outer layers render the trimmed ware more resistant to fracture.

When an article is trimmed from a composite sheet in a conventional fashion, such as taught by the above Giffen patent, a gap remains along the trimmed edge between the outer stratums. For example, if a composite sheet with an inner stratum of about .070 inch in thickness and outer stratums of about .003 inch each in thickness, were trimmed conventionally, a gap would remain between the outer stratums of between about .020 inch and .060 inch.

SUMMARY OF THE INVENTION

According to the present invention an article formed in a composite sheet of glass is trimmed in a manner to minimize any gap remaining between the outer stratums and virtually eliminate the effect thereof.

A novel contoured trimmer element, having a cutting edge recessed by means of a sloping surface, engages an outer layer or stratum of the composite sheet and draws it transversely of the plane of the sheet and over the core portion before coming into trimming engagement with the mold edge. The actual shearing of the glass sheet does not take place until the upper stratum of glass has been drawn downward by the sloping surface about the rim or edge of the article.

DETAILED DESCRIPTION OF THE INVENTION

Figure 1:
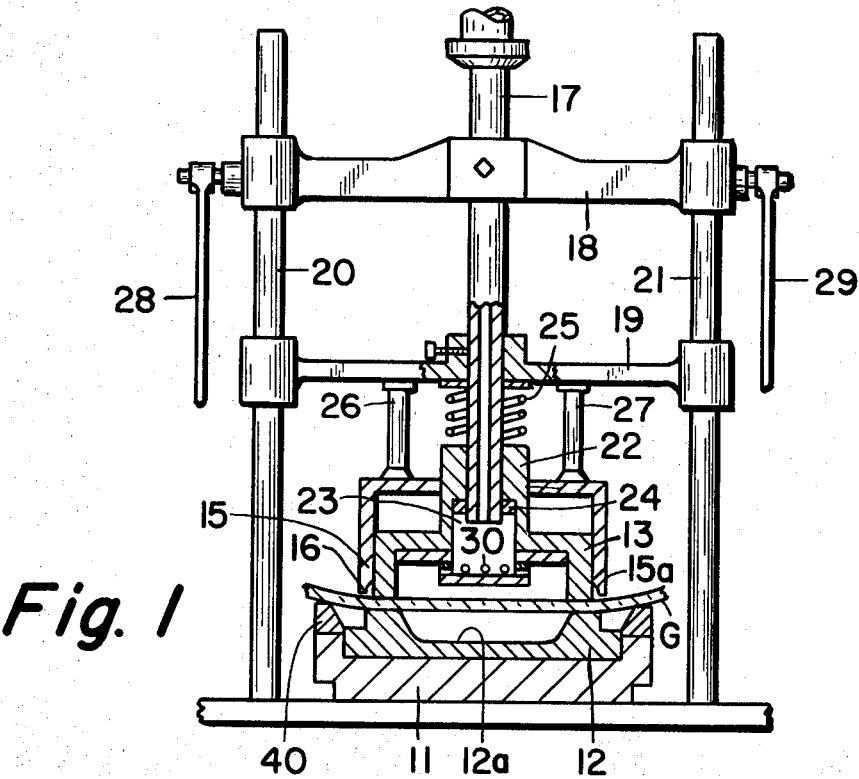
FIG. 1 is a front elevation of a glass forming apparatus, partly in section, embodying the invention and showing an unformed composite sheet of molten glass associated therewith.
Figure 2:
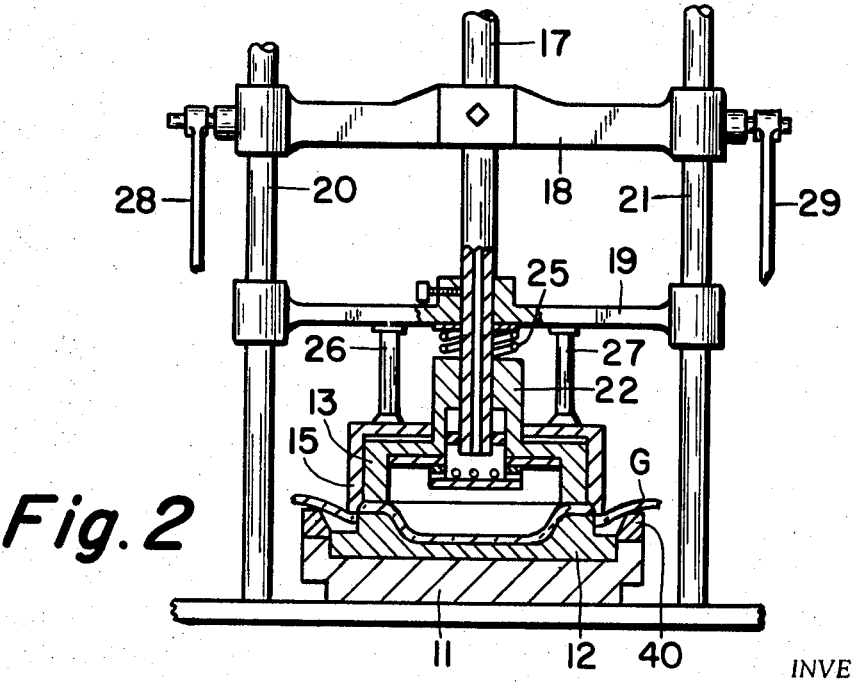
FIG. 2 is a view similar to FIG. 1, but showing the apparatus in its alternative position with the article formed and trimmed from the sheet.

Referring now to the drawings, the numeral 11 designates an appropriate base support for a mold or die 12 whose upper face is provided with a cavity 12a for forming an article from a hot pliable sheet of composite glass G. The molten sheet G is positioned over the cavity and differential pressure is applied to force the heat-softened sheet to conform to the contour of the cavity and form an article of desired configuration.

A blow-head 13 is movable toward and away from the die 12, so as to intermittently clamp the glass sheet G therebetween when fluid pressure is admitted to the blow-head. The sheet G is thereby held in position over the cavity 12a and forced into conformity with the cavity wall surfaces of the die. The composite sheet G projects over the vertically disposed bordering edge of the wall of die 12, and preferably rests on a supporting surface portion or fence 40 surrounding such wall. An edge former or trimmer 15 surrounds blow-head 13 for trimming the sheet about the outer edge of die 12.

As shown in FIG. 1, the leading cutting edge 16 of trimmer 15 is normally spaced upwardly from the bottom of the blow-head 13 when the latter is lowered into contact with sheet G. However, after forming, the trimmer is moved downwardly and first engages the upper stratum 14a (FIG. 4) of the composite sheet G, with the downwardly inclined sloping surface 15a drawing such upper stratum downwardly. As the trimmer 15 continues to move downwardly, the upper stratum 14a of the sheet is rolled over the edge of the inner stratum 14 and into close proximity to the lowermost stratum 14b, before the trimmer edge and die edge become operative to effect the actual trimming of the newly formed ware from the composite sheet G.

As illustrated, a common activating means is provided for both the blow-head 13 and the edge former or trimmer 15, including a tubular activating plunger 17 through which fluid can be supplied to the interior of blow-head 13. Plunger 17 is provided with crossheads 18 and 19 which are slidable upon suitable guides 20 and 21. The blow-head 13 has an upstanding hollow hub 22, provided with a cavity 23, into which the lower end of plunger 17 slidably passes. Withdrawal of plunger 17 from cavity 23 is prevented by a suitable stop 24. A coiled spring 25 surrounds plunger 17 between the cross-head 19 and hub 22, and moves the blow-head 13 downwardly when the plunger descends while permitting the further lowering of plunger 17 when the blow-head has come into contact with the sheet G.

The additional movement of the plunger 17 is utilized to operate the edge former or trimmer 15 through the medium of vertically disposed rods 26 and 27, rigidly connecting the trimmer with the crosshead 19. Pitman rods 28 and 29, connected with the ends of crosshead 18 and operable by suitable eccentrics, not shown, operate plunger 17. Air is supplied to the interior of the blowhead 13 via passages at 30, although if desired, the differential pressure may be provided by the application of a vacuum to the mold cavity 12a.

Figure 3:
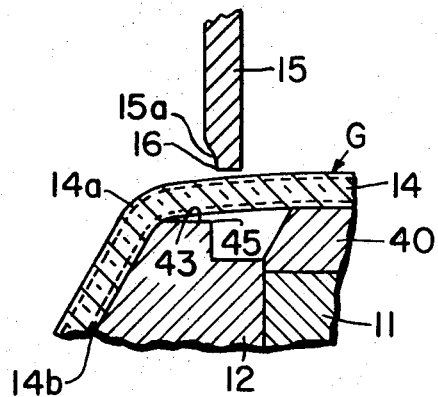
FIG. 3 is an enlarged fragmental view in section of the apparatus in the position shown in FIG. 1, and illustrating the several stratums of a composite glass sheet associated therewith.
Figure 4:
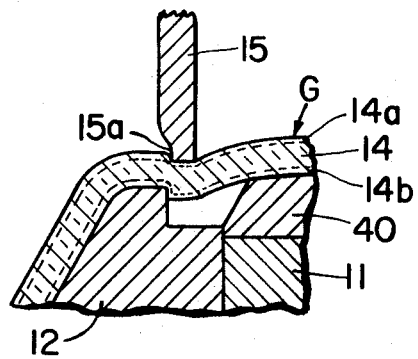
FIG. 4 is a view similar to FIG. 3, but showing the downwardly inclined or sloping surface of the trimmer in drawing engagement with the glass sheet before actual trimming is effected.
Figure 5:
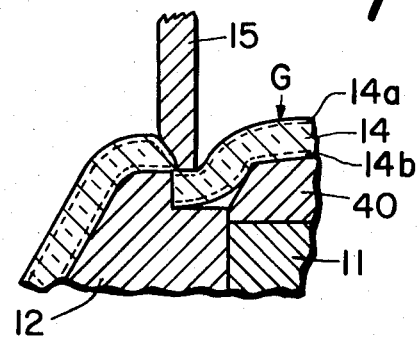
FIG. 5 is a view similar to FIGS. 3 and 4, but with the apparatus in the trimmed position in which it is shown in FIG. 2.
Figure 6:
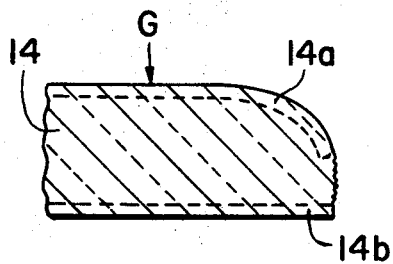
FIG. 6 is a greatly enlarged fragmental view of the edge of a composite article as it would appear when trimmed in a conventional fashion.

As will be observed from FIG. 3, the top surface area 43 of the die 12 is at a lower level than the sheet supporting surface 40 immediately outward thereof. Sheet G is accordingly prevented from contacting die surface area 43, other than at its inner bordering edge, until it is drawn into contact therewith by the trimmer 15 as shown in FIG. 4. Accordingly the glass remains pliable to effectuate trimming without detrimental checking of the glass.

Figure 7:
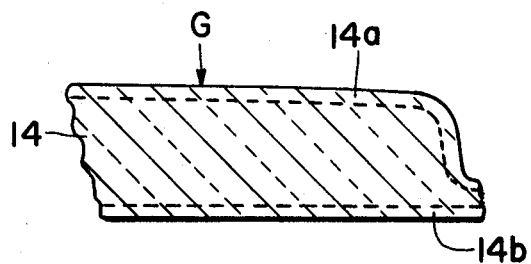
FIG. 7 is a view similar to FIG. 6, but illustrating an edge of a composite article as trimmed with the apparatus embodying the present invention.

The leading edge 16 of edge former and trimmer 15 is slightly laterally spaced from the trimming edge 45 of the die, and accordingly with sloping surface 15a rolls the sheet G downward thereabout before the trimming edges actually effect trimming. By the action of sloping surface 15a upper stratum 14a of the composite sheet G is rolled toward the lowermost stratum 14b, and thus when trimming is finally completed, the upper and lower stratums of the edge of the article are almost closed about the center stratum 14, as illustrated in FIG. 7.

As an example of the gain in use of the invention, two separate sheets of glass for the adhered plies of the following composition were formed: 57.77% $SiO_2$, 14.94% $Al_2O_3$, 9.96% CaO, 6.87% MgO, 3.98% $B_2O_3$, 5.98% BaO, and 0.50% $As_2O_3$. A single sheet of clear alkali aluminosilicate core glass of the following composition was also formed: 56.84% $SiO_2$, 19.80% $Al_2O_3$, 12.80% $Na_2O$, 3.18% CaO, 4.30% $K_2O$, 2.11% MgO, and 0.99% $As_2O_3$. These sheets were fused together, at about 1300° C., so as to form a three-ply laminated sheet wherein the core glass was the center ply. At 1300° C., the viscosity of the core glass was about 4000 poises while that of the adhered plies was about 1000 poises. The liquidus temperature of the core and adhered plies were 1047° C. and 1144° C., respectively. The hot laminated sheet was next sagged into a custard cup shaped mold with the aid of vacuum, and trimmed in the new manner taught herein, removed from the mold, and allowed to cool.

The resultant custard cup had a rim diameter of 4½ inches, a bottom diameter of 3 inches, and was 1⅜ inches high. The core glass ply was 0.080 inch thick and the total thickness of the adhered plies was 0.004 inch. The trimmed edge of the custard cup was virtually sealed by the outer plies so that very little of the core glass was exposed. In fact, the size of the gap remaining between outer plies is so reduced by the trimming procedure disclosed herein, that rim strength is increased to about twice that obtained with conventional trimming.

From the foregoing, it will be understood that the invention resides primarily in the concept of a method of and apparatus for performing a trimming operation in such a manner that the bordering edges of the upper and lower stratums of an article trimmed from a composite sheet are brought into close proximity to retain strength. An inner core or stratum, which is under tension, is virtually encased within the confines of the outer stratums, which are under compression, thus giving the article substantially the effective strength of an article whose inner stratum is wholly confined within its outer stratums.

I claim:

1. A method of forming a strengthened article from a sheet of stratified glass which comprises, conforming a composite sheet of heat-softened glass having inner and outer stratums to the contour of a mold cavity, trimming excess glass from about the article, and forcing the outer stratums of glass into close proximity adjacent the trimmed edges of the article prior to effectuating the actual trimming.

2. A method of forming a glass article as defined in claim 1 wherein one outer stratum of the article bordering edge is rolled over the major bordering portion of an inner stratum of the article bordering edge into close proximity with the remaining outer stratum of the article bordering edge.

3. Apparatus for forming and trimming a glass article from a stratified sheet of pliable glass comprising, a forming die having a trimming edge, means for forming a glass article from a stratified sheet of glass arranged over said die, means for concurrently forming and trimming the bordering edge of the article from the surrounding glass sheet, and said forming and trimming means including a contoured trimmer having a downwardly inclined sloping surface terminating in a cutting edge for engagement with the glass sheet to draw the upper stratum of such glass downwardly over an inner stratum and about the trimming edge of the die before coming into trimming relation therewith.

4. Apparatus for forming and trimming a glass article from a stratified sheet of pliable glass comprising, a forming die, means for forming a glass article from a stratified sheet of glass arranged over said die, means for concurrently forming and trimming the bordering edge of the article from the surrounding glass sheet; and said forming and trimming means including a contoured trimmer element, said trimmer element being positionable over said forming die, and the lower end of said trimmer element being laterally spaced from an outer trim edge of said die so that said trimmer element moves the sheet downwardly about such trim edge before the trimmer element engages the trim edge of the die.

5. A glass article of stratified glass material having an inner stratum and a pair of outer stratums; said article having a trim edge about its periphery; edge portions of said outer stratums, about said trim edge, overlying edge portions of said inner stratum; and said outer stratums, at said trim edge, terminating in close proximity to one another adjacent said inner stratum.

References Cited
UNITED STATES PATENTS
3,193,367  7/1965  Giffen _____ 65—70

FOREIGN PATENTS
1,070,349  12/1959  Germany _____ 65—48

ARTHUR D. KELLOGG, Primary Examiner

U.S. Cl. X.R.

161—193; 65—105, 112, 177